July 15, 1952
H. WELCH
2,603,583
PECTIN PENICILLIN PREPARATION
Filed March 4, 1949
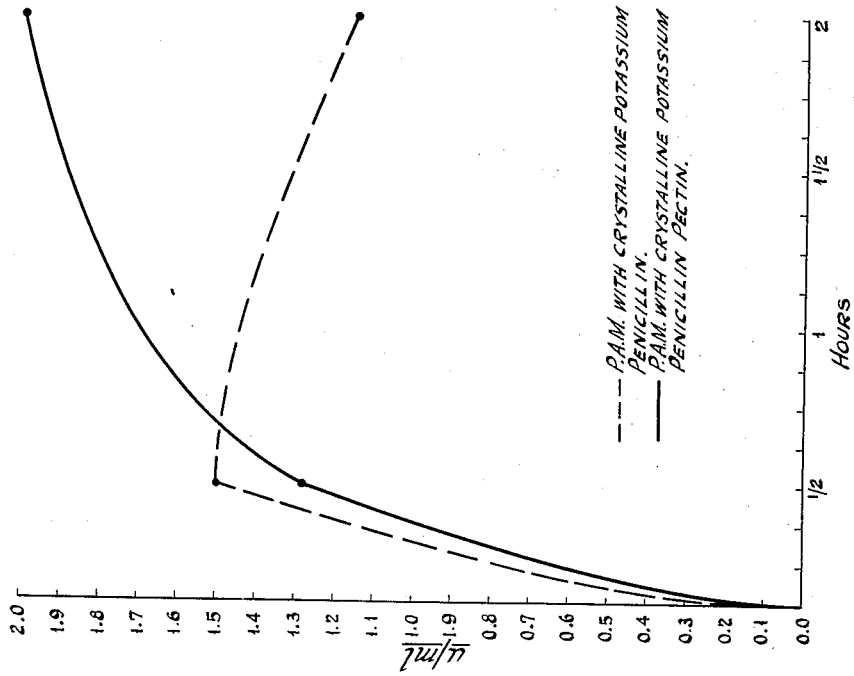
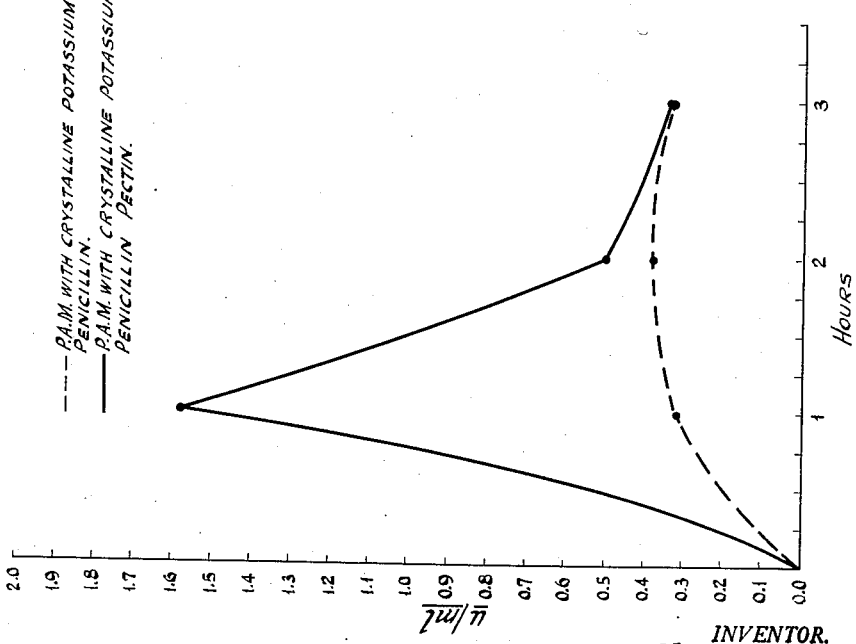
INVENTOR.
HENRY WELCH.
BY
ATTORNEY Patented July 15, 1952

2,603,583

UNITED STATES PATENT OFFICE 2,603,583

PECTIN PENICILLIN PREPARATION

Henry Welch, Silver Spring, Md., assignor to the United States of America

Application March 4, 1949, Serial No. 79,624

1 Claim. (Cl. 167—65)

(Granted under the act of March 3, 1883, as amended April 30, 1928; 370 O. G. 757)

My invention relates to a novel pectin penicillin preparation and a process for the production thereof.

This application is an improvement upon and in part a continuation of applications, Serial Number 752,298 filed June 3, 1947 for Therapeutic Products, now my Patent Number 2,491,537, and Serial Number 770,558 filed August 25, 1947, for Pectin Products and the Process for Making Them, now my Patent Number 2,518,510.

The relatively long maintenance of blood concentrations of penicillin following the injection of procaine penicillin in oil containing aluminum monostearate has resulted in a relatively low "peak" concentration. By "peak" concentration is meant the highest concentration of penicillin obtainable in the blood immediately following injection. The "peak" concentration obtained with this drug following the injection of 300,000 units averages approximately 0.13 unit per milliliter. This low "peak" concentration is not satisfactory in the treatment of acute diseases due to penicillin sensitive bacteria. Clinicians utilizing this product do not obtain the rapid dramatic cures which were obtainable with aqueous solutions of sodium or potassium penicillin. For example, acute pneumonias and severe streptococcic infections do not show the dramatic response to the aluminum monostearate preparation containing procaine penicillin that has been obtainable in the past with aqueous penicillin. Furthermore, in the treatment of syphilis, where the prolonged action of the aluminum monostearate preparation containing procaine penicillin should have its greatest value, the results obtained again are not as satisfactory as have been obtainable with aqueous penicillin. The prolonged action of the aluminum monostearate preparation containing procaine penicillin results from two factors, (1) the insolubility of the procaine penicillin, and (2) the protective effect from solution in body fluids resulting from the presence of the aluminum monostearate itself. Aluminum monostearate is a hydrophobic substance and its water repellency delays solution and absorption of the procaine penicillin.

It may be expected that the addition to the aluminum monostearate procaine penicillin preparation of either potassium or sodium crystalline penicillin (both of which are extremely soluble) would be a satisfactory means of increasing the so-called "peak" concentrations. However, aluminum monostearate not only protects procaine penicillin from rapid absorption by tissue fluids but similarly protects any other penicillin added to the preparation. As a matter of fact, the original monostearate preparations did not contain procaine penicillin but sodium or potassium penicillin instead, and the action of both of these penicillins was prolonged in the body because of the presence of aluminum monostearate. By actual trial the addition of 50,000 units of crystalline penicillin (potassium or sodium) to the standard monostearate preparation increases the "peak" level somewhat (on the order of 0.5 unit per milliliter of serum). This blood concentration (0.5 unit per milliliter of serum) is quite low when compared with the injection of 50,000 units of crystalline penicillin alone, which results in a "peak" concentration of penicillin in the blood of approximately 2.0 units per milliliter.

In the patent applications listed above (Serial Number 752,298 now my Patent Number 2,491,537, and Serial Number 770,558, now my Patent Number 2,518,510) it was demonstrated that the injection of dry crystalline sodium or potassium penicillin in oil containing relatively large amounts of pectin resulted in a prolongation of penicillin activity in the body. It was observed, as well, in these studies that the concentration of pectin was important within certain ranges in obtaining an efficient product. When the concentration of pectin was relatively low (on the order of 60 milligrams or less per one milliliter of oil) prolongation of the action of penicillin was not obtained. Pectin itself is a hydrophilic agent and the principle of the original pectin in oil preparation described in the above identified applications was related to these hydrophilic qualities. Thus when penicillin in oil with pectin was injected into the body the pectin attracted and withdrew water from the tissues, formed a gel, and thus protected the penicillin within the gel matrix from rapid absorption by the tissue fluids. With the knowledge that aluminum monostearate is a hydrophobic substance and has a strong "water repellency" and that pectin is a hydrophilic substance and thus has a strong attraction for water, it appeared possible that these properties of aluminum monostearate and pectin could be utilized in a product that would give relatively high "peak" levels of penicillin in the body. Such a product obviously could not contain sufficient pectin to form a gel since if it did the result would be the marked prolongation effect obtained and described under the above patent applications (Serial Number 752,298 and Serial Number 770,558). However, by utilizing very small quantities of pectin prolongation effects would either not be obtained or would be at a minimum, and yet the strong affinity for water of pectin will attract the water to the soluble penicillin and bring about its solution. Briefly, therefore, in the present invention, crystalline potassium penicillin is coated with an extremely thin layer of pectin, moisture is eliminated by vacuum drying, and the pectin coated penicillin is then added to the basic procaine penicillin in oil containing 2 percent aluminum monostearate.

Details of the procedure used in making the preparation are as follows:

Ten grams of potassium penicillin (crystalline) are dissolved in 32 ml. of a 1.0 percent solution of pectin (0.320 gm.). When dissolved, the penicillin-pectin solution is placed in a blender with the blades turning at slow speed. Approximately 750 ml. of acetone (moisture content 0.5% or less) is rapidly added (final acetone concentration for crystallization 95%) and the speed of the blender increased to full as the crystals begin forming and allowed to run for 30-60 seconds. The crystals are collected on paper by vacuum filtration and immediately washed four times with pure acetone. This is to remove residual water as rapidly as possible and thus prevent resolution of the material. The filter cake is dried in vacuo at 80-90° C. for four hours and broken into a fine powder by rotating a few minutes in a sterile ball mill or bacterial grinder. It is then collected, sterilized by heat and preserved in a tightly stoppered bottle. The coated potassium penicillin microscopically consists of long slender needles. This procedure utilizes approximately 1 mg. of pectin for each 30 mg. (50,000 units) of penicillin.

The addition of acetone to the aqueous penicillin pectin solution results in a coprecipitation of penicillin and pectin. The precipitation of the penicillin and pectin is almost simultaneous. The pectin precipitates out of solution in particles of approximately one micron or less. The potassium penicillin precipitates as long slender needles which are coated with the micron sized pectin. It is essential to obtain an efficient precipitation of penicillin and pectin that the precipitation be practically simultaneous. A delay in the precipitation of the penicillin because of, for example, excess water in the acetone results in a product which is not efficient in bringing about rapid solution of the penicillin upon injection into the body. Therefore, although a few seconds may elapse between the precipitation of the pectin and the penicillin it is advisable to have the pectin and penicillin coprecipitate simultaneously.

Two batches were prepared as above, combined and milled to give a uniform preparation. The iodometric assay of the original potassium salt and the coated salt were identical (1535 units/mg.). Seven hundred milliliters of pooled procaine penicillin with aluminum monostearate in oil was divided into five equal lots. One lot was subdivided and held as control. Four experimental lots were prepared as follows:

A. Pooled procaine penicillin plus 4.75 gms. of potassium penicillin, to afford 50,000 units/ml. of added crystalline penicillin. Control (no pectin).
B. Pooled procaine penicillin plus 4.75 gms. of crystalline potassium penicillin coated with pectin.
C. Pooled procaine penicillin plus 9.5 gms. of potassium penicillin, to afford 100,000 units/ml. of added crystalline penicillin. Control (no pectin).
D. Pooled procaine penicillin plus 9.5 gms. of crystalline potassium penicillin coated with pectin.

The crystalline potassium penicillin used was the same salt as that employed in making the pectin treated material. The assay values of the finished product was 94% of that calculated for the coprecipitated salt, and 95% of the calculated value for the crystalline potassium salt.

Twenty five volunteers were selected. Thirteen received the procaine penicillin in oil with aluminum monostearate containing the pectin coated salt and twelve received the procaine penicillin in oil containing the uncoated salt. Bloods were drawn at one, two and three hours and the serum penicillin level determined by the *Bacillus subtilis* serial dilution assay. The following tables show the results obtained.

*Penicillin blood levels following the injection of one ml. of procaine penicillin with aluminum monostearate in oil and 50,000 units of potassium penicillin pectin coated*

|  | 1 Hour | 2 Hours | 3 Hours |
| --- | --- | --- | --- |
| A. H. T | 1.0 | 0.5 | 0.5 |
| S. W | 4.0 | 0.5 | 0.5 |
| R. R | 0.5 | 0.5 | 0.25 |
| O. W | 1.0 | 0.5 | 0.25 |
| F. A. K. (0.8 ml.) | 1.0 | 0.5 | 0.5 |
| H. M. D | 1.0 | 1.0 | 0.5 |
| L. P | 2.0 | 0.5 | 0.5 |
| G. B | 2.0 | 0.5 | 0.5 |
| R. G | 2.0 | 1.0 | 0.5 |
| R. C | 1.0 | 0.25 | 0.25 |
| T. J. J | 2.0 | 0.5 | 0.5 |
| M. B. K | 2.0 | 0.5 | 0.5 |
| W. T | 2.0 | 1.0 | 0.5 |
| Average | 1.58 | 0.60 | 0.44 |

*Penicillin blood levels following the injection of one ml. of procaine penicillin with aluminum monostearate in oil plus 50,000 units potassium penicillin (crystalline)*

|  | 1 Hour | 2 Hours | 3 Hours |
| --- | --- | --- | --- |
| S. H. (2 sites) | 0.5 | 0.5 | 0.5 |
| W. B | 0.5 | 0.5 | 0.5 |
| G. W | 0.5 | 0.25 | (1) |
| W. F. B | 0.25 | 0.25 | 0.5 |
| R. V. B | 0.5 | 0.25 | 0.25 |
| B. J. (2 sites) | 0.25 | 1.0 | 0.25 |
| B. C | 0.5 | 1.0 | 0.5 |
| J. M | 0.25 | 0.25 | 0.125 |
| B. C | 0.5 | 1.0 | 1.0 |
| T. H. A | 0.5 | 0.125 | 0.5 |
| L. T. F | 0.5 | 0.5 | 0.5 |
| L. O | 0.25 | 0.25 | 0.25 |
| Average | 0.42 | 0.48 | 0.43 |

[1] No blood.

The above results indicate that procaine penicillin in oil containing aluminum monostearate to which has been added pectin coated potassium penicillin in a concentration of 50,000 units, results in blood levels that are at least three times as high as a preparation containing 50,000 units of uncoated potassium penicillin at the "peak" concentration. A graph showing the results on the 25 patients tested is Figure 1 of the accompanying drawing.

Following the results obtained with procaine penicillin in oil with aluminum monostearate, 300,000 units, containing 50,000 units of pectin coated potassium penicillin where the blood concentrations were increased at least three times over that obtained with the same monostearate preparation containing the uncoated potassium penicillin, studies were made of two similar preparations containing respectively 100,000 units of potassium penicillin, coated and uncoated. The pectin coated penicillin at the 100,000 unit level resulted in blood levels averaging 2.0 units per ml. of blood at the second hour. At the second hour, with the same potassium penicillin untreated at a concentration of 100,000 units the average level was 1.08 units per ml. of blood and the "peak" concentration had been reached with this preparation, since the one hour blood contained 1.3 units per ml. as shown in the following tables.

*Penicillin levels following the injection of 300,000 units of procaine penicillin in oil with aluminum monostearate containing 100,000 units crystalline potassium penicillin with pectin*

|  | ½ Hour | 1 Hour | 2 Hours | 96 Hours |
|---|---|---|---|---|
| B., G | 1.0 | 1.0 | 1.0 | .06 |
| K., F. A | 2.0 | 2.0 | 2.0 | .125 |
| B., R | 1.0 | 2.0 | 2.0 | 0 |
| C., R | 1.0 | 2.0 | 4.0 | .06 |
| G., R | 1.0 | 1.0 | 2.0 | .06 |
| B., C | 4.0 | 4.0 | 4.0 | 0 |
| J., B | 0.5 | 1.0 | 1.0 | .125 |
| B., W | 1.0 | 1.0 | 2.0 | .125 |
| D., H. C | 0.5 | 0.5 | 1.0 | .06 |
| T., A. H | 1.0 | 1.0 | 0.5 | 0 |
| C., R | 2.0 | 1.0 | 2.0 | 0 |
| J., C | 0.5 | 1.0 | 1.0 | .125 |
| Average | 1.3 | 1.46 | 2.0 | 0.06 |

*Penicillin levels following the injection of 300,000 units of procaine penicillin in oil with aluminum monostearate containing 100,000 units crystalline potassium penicillin*

|  | ½ Hour | 1 Hour | 2 Hours | 96 Hours |
|---|---|---|---|---|
| D., H | 1.0 | 1.0 | 1.0 | .06 |
| C., B. C | 1.0 | 0.5 | 1.0 | .125 |
| B., R | 2.0 | 1.0 | 1.0 | .06 |
| A., T | 1.0 | 1.0 | 1.0 | 0 |
| M., J | 0.5 | 0.5 | 0.5 | .06 |
| McI., G | 0.5 | 0.5 | 0.5 | .06 |
| B., W | 2.0 | 2.0 | 2.0 | 0 |
| S., J | 2.0 | 2.0 | 2.0 | 0 |
| W., G | 4.0 | 2.0 | 2.0 | .06 |
| O., L | 1.0 | 0.5 | 0.5 | 0 |
| C., B | 2.0 | 4.0 | 1.0 | 0 |
| S., A | 1.0 | 0.5 | 0.5 | .06 |
| Average | 1.5 | 1.3 | 1.08 | 0.04 |

Curves showing a comparison of the two preparations (100,000 units potassium penicillin pectin coated plus 300,000 units procaine penicillin, and 100,000 units potassium penicillin not coated plus 300,000 units procaine penicillin) are illustrated in Figure 2 of the accompanying drawing. In addition to the blood samples taken at one-half hour, one hour and two hours, samples were also taken at 96 hours.

Since blood levels of at least two units per ml. were demonstrated with this type of preparation and in addition a marked prolongation is obtained, the possibilities for uses of such a product are considerable. Where delayed therapeutic results are obtained with the monostearate preparation alone, because of the low peak levels such results will be eliminated by the use of the booster effect of pectin coated potassium penicillin.

In addition to the ability of the pectin coated crystalline penicillin to increase the "peak" concentrations of penicillin in the body, there are other advantages to this preparation. If crystalline penicillin alone not coated with pectin is added to the procaine penicillin in oil and aluminum monostearate preparation, the mixture tends to stick to syringes when an attempt is made to remove it from the vial. In one of the studies made in determining the effects of procaine penicillin in oil with aluminum monostearate containing potassium penicillin coated and uncoated with pectin, it was observed that in filling the syringes with these materials prior to injection the technician filling the pectin coated material filled thirteen syringes while the technician filling the uncoated crystalline potassium penicillin in the aluminum monostearate preparation was filling four. Furthermore, when the procaine penicillin in oil containing aluminum monostearate to which had been added 100,000 units of crystalline potassium penicillin not coated with pectin was injected in several patients it was necessary to use more than one injection site because of the poor syringeability of this preparation. No difficulty was encountered when the potassium penicillin coated with pectin was utilized at the 100,000 units level in the procaine in oil containing aluminum monostearate. In other words, the use of pectin coated potassium penicillin in the aluminum monostearate product improves the syringeability of the product.

In addition to the use of pectin coated penicillin in the monostearate preparation, other applications are possible. When potassium penicillin is coated with a thin layer of pectin its physical characteristics are markedly changed. Potassium penicillin tends to "cake" in a container when the container is rapped sharply on a surface. When the coated penicillin is similarly treated the caking does not occur because of the light fluffy characteristics of the product. Its use in inhalator administration is quite possible. Furthermore, the characteristics of the pectin coated penicillin should be of considerable value in filling machines where potassium penicillin tends to "cake up" and result in inaccurate vial filling.

To determine the peak level and prolongation, using procaine penicillin in oil with aluminum monostearate, 300,000 units, plus 100,000 units potassium penicillin (pectin coated) per ml. as a possible single injection treatment for syphilis, ten volunteers were injected with 8-cc. (4-cc. in each of two depots) of the above product. Each volunteer therefore received 2.4 million units of procaine penicillin and 800,000 units of potassium penicillin. Very high concentrations of penicillin in the blood were obtained in the first few hours after injection. The maximum level occurred at the second hour with an average level of 15.6 units per ml. of blood. This extremely high level resulted from levels obtained in two of the volunteers, B. and A., who showed 64.0 and 32.0 units, respectively, in their blood at the second hour. Since all other patients but one showed levels of 8.0 units, it would appear that the average level is close to 8.0 units at the peak. Blood concentrations were determined not only during the first three hours but on the 5th, 6th, and 7th days as well. Eighty percent of the patients showed levels on the 5th day, 70 percent on the 6th day, while only one patient showed a level on the 7th day. One of the patients, B., who showed no level on the 5th day, did have a level on the 6th day. It may be considered, therefore, that 90 percent of the patients injected had penicillin in their blood on the 5th day. The blood levels obtained are tabulated below.

*Injected 8-cc. in two depots of 300,000 units procaine penicillin in oil with aluminum monostearate plus 100,000 units potassium penicillin (pectin coated) per ml. Total 2.4 million units of procaine penicillin plus 800,000 units potassium penicillin*

SUBTILIS METHOD

|   | 1 hr. | 2 hrs. | 3 hrs. | 5 days | 6 days | 7 days |
|---|---|---|---|---|---|---|
| 1. L. L. F | 8.0 | 8.0 | 8.0 | .06 | .125 | 0 |
| 2. K. C | 4.0 | 8.0 | | .125 | .125 | 0 |
| 3. J. B | 8.0 | 64.0 | | 0 | .5 | 0 |
| 4. W. S | 4.0 | 8.0 | 2.0 | .125 | 1.0 | 0 |
| 5. D. J | 4.0 | 8.0 | 4.0 | .125 | .125 | 0 |
| 6. M. S | 4.0 | 8.0 | 4.0 | .03 | 0 | 0 |
| 7. J. D | 4.0 | 8.0 | 4.0 | .25 | .06 | 0 |
| 8. L. A | 8.0 | 32.0 | 8.0 | 0 | 0 | |
| 9. E. C | 1.0 | 4.0 | 2.0 | .125 | .25 | .125 |
| 10. P. G | 8.0 | 8.0 | 4.0 | .125 | 0 | 0 |

At the Venereal Disease Clinic in the District of Columbia it has been demonstrated with penicillin in oil and wax that if patients can be treated with this preparation so as to obtain a level in 90 percent of them for a period of five days, a cure rate of approximately 80 to 90 percent can be expected. It would appear that the monostearate preparation containing pectin coated potassium penicillin can accomplish the above with a single injection. This should be extremely valuable in venereal disease clinics, since high levels are obtained with the product which should be satisfactory not only for venereal diseases but for acute infections as well.

The invention described herein may be manufactured and used anywhere by or for the Government of the United States for governmental purposes without the payment to me of any royalty thereon in accordance with the provisions of the act of April 30, 1928 (Ch. 460, 45 Stat. L. 467).

I claim:

An injectable penicillin composition yielding rapid high blood levels with prolonged therapy levels of penicillin which comprises procaine penicillin in oil with aluminum monostearate having combined therewith a water-soluble crystalline penicillin compound coated with about one part of pectin to about thirty parts of said water-soluble penicillin compound, whereby the coating of pectin enhances the solubility in aqueous body fluids of the coated water-soluble penicillin compound.

HENRY WELCH.

REFERENCES CITED

The following references are of record in the file of this patent:

UNITED STATES PATENTS

| Number | Name | Date |
|---|---|---|
| 1,928,346 | Axelrod | Sept. 26, 1933 |
| 2,142,537 | Tisza | Jan. 3, 1939 |
| 2,207,990 | Miller | June 16, 1940 |
| 2,499,039 | Libby | Sept. 7, 1948 |
| 2,491,537 | Welch | Dec. 20, 1949 |

OTHER REFERENCES

Venereal Disease Information, February 1945, page 31.

Science News Letter, October 4, 1947, page 210.

American Druggist, July 1948, page 103.

J. Amer. Pharm. Assn., Practical Pharmacy Ed., March 1949, page 179.